Figure 17:
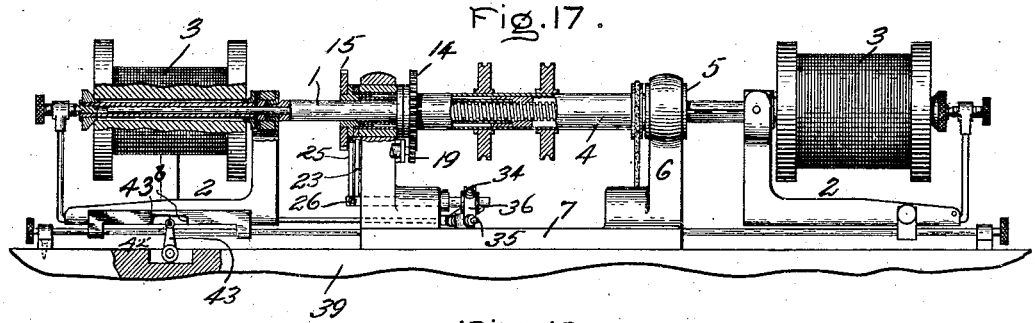

No. 873,717. PATENTED DEC. 17, 1907.
J. G. CALLAN.
RECIPROCATING MECHANISM FOR SPOOLING MACHINES.
APPLICATION FILED MAY 8, 1905.
4 SHEETS—SHEET 1.
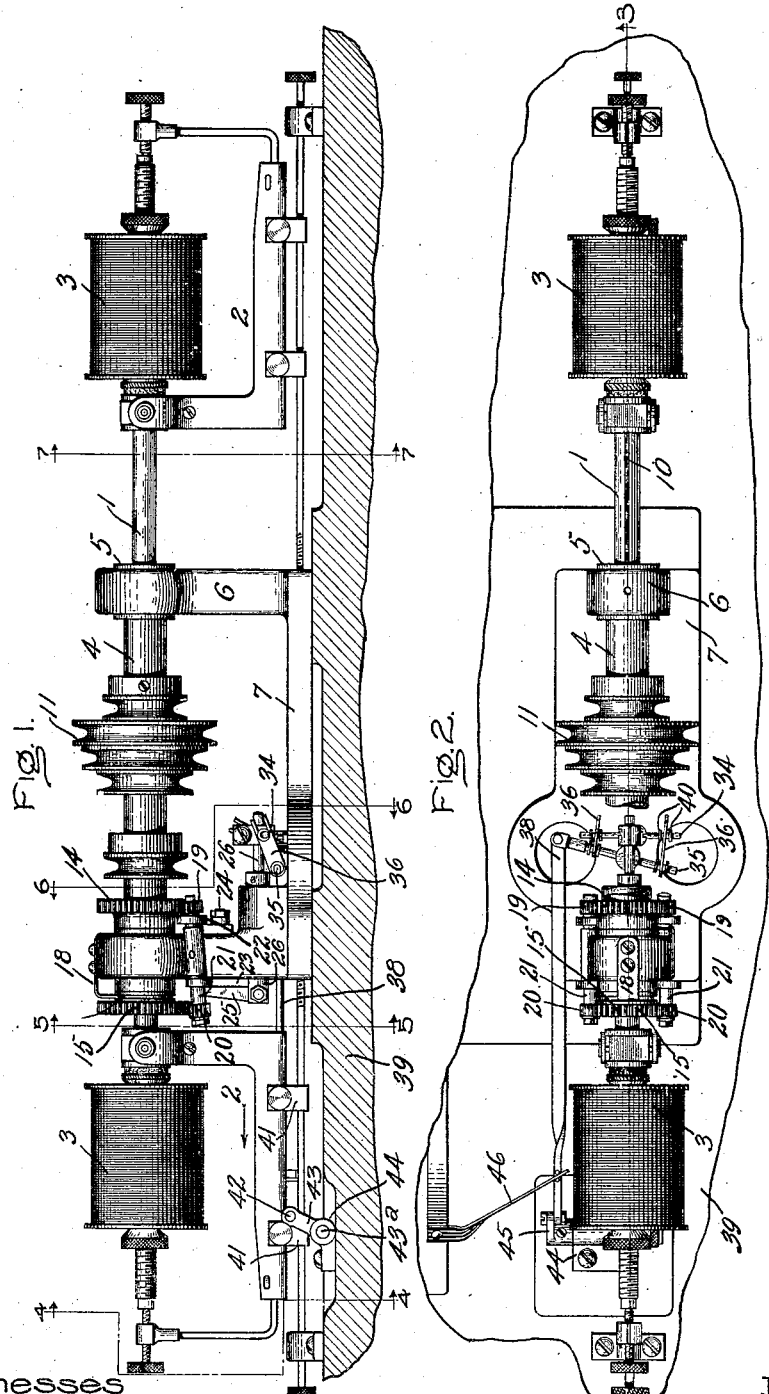
Witnesses
Inventor
John G. Callan
By
Att'y.

No. 873,717. PATENTED DEC. 17, 1907.
J. G. CALLAN.
RECIPROCATING MECHANISM FOR SPOOLING MACHINES.
APPLICATION FILED MAY 8, 1905.
4 SHEETS—SHEET 2.
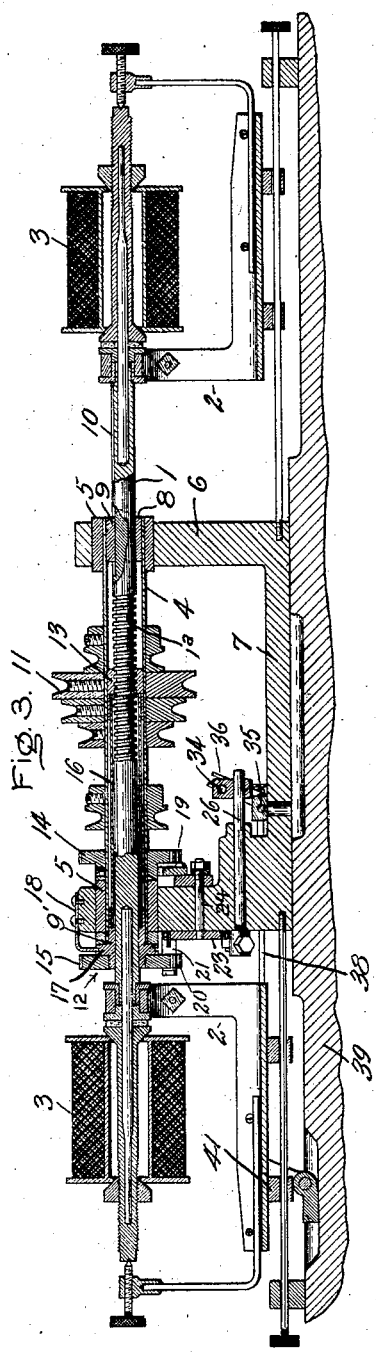
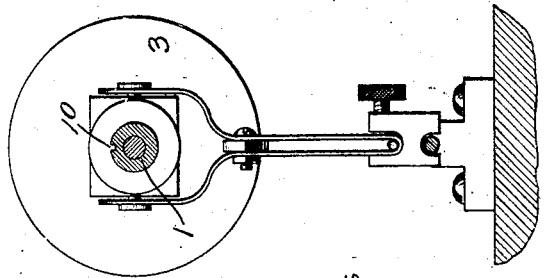
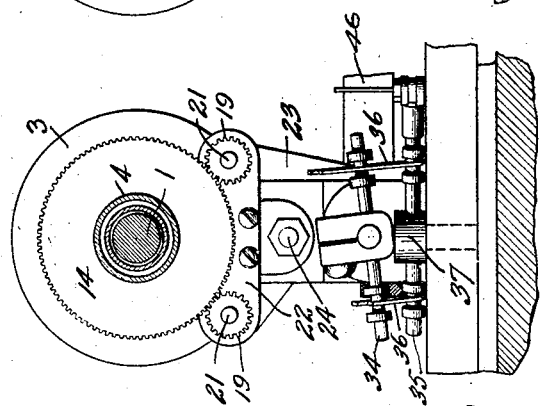
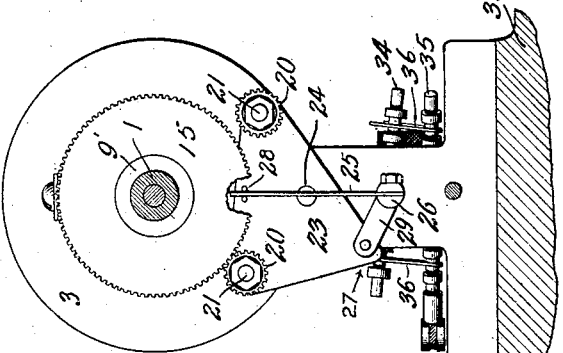
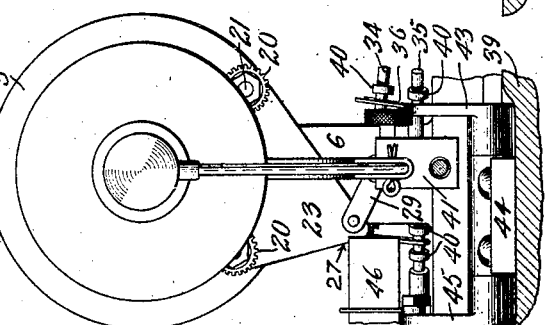
Witnesses
Inventor
John G. Callan, No. 873,717. PATENTED DEC. 17, 1907.
J. G. CALLAN.
RECIPROCATING MECHANISM FOR SPOOLING MACHINES.
APPLICATION FILED MAY 8, 1905.
4 SHEETS—SHEET 3.
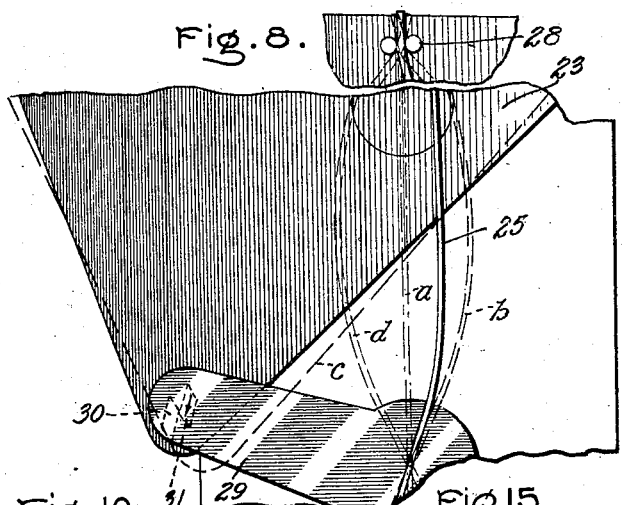
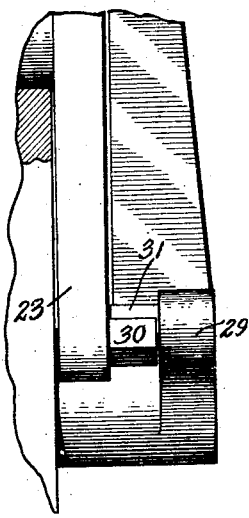
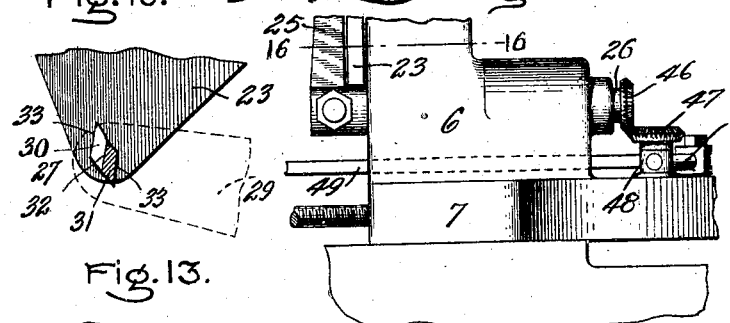
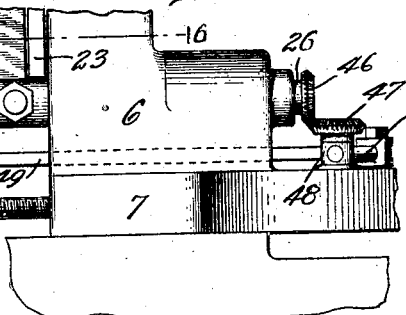
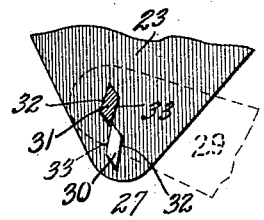
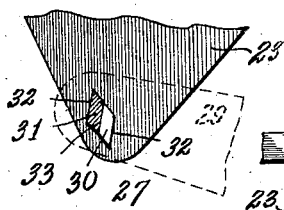
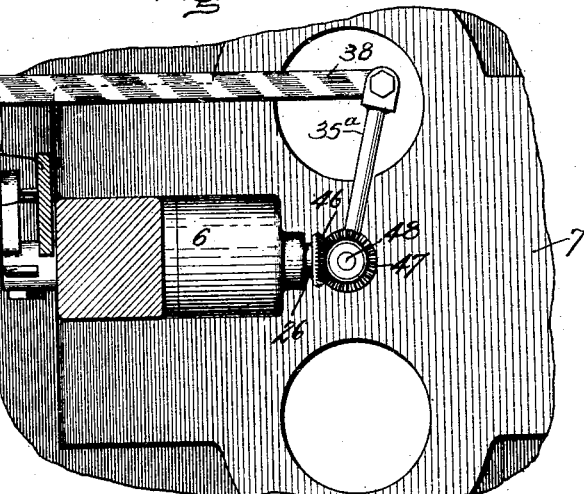
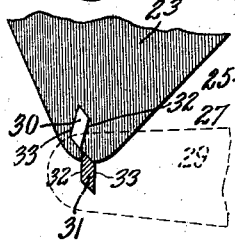
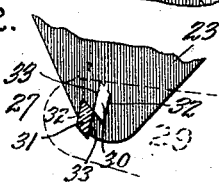
Witnesses
Inventor,
John G. Callan.
By ____, Atty.

No. 873,717. PATENTED DEC. 17, 1907.
J. G. CALLAN.
RECIPROCATING MECHANISM FOR SPOOLING MACHINES.
APPLICATION FILED MAY 8, 1905.

4 SHEETS—SHEET 4.

Witnesses:
Benjamin B. Hull
Helen Oxford

Inventor,
John G. Callan,
By Albert G. Davis
Att'y.

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

RECIPROCATING MECHANISM FOR SPOOLING-MACHINES.

No. 873,717.    Specification of Letters Patent.    Patented Dec. 17, 1907.

Application filed May 8, 1905. Serial No. 259,313.

*To all whom it may concern:*

Be it known that I, JOHN G. CALLAN, a citizen of the United States, residing at Lynn, county of Essex, State of Massachusetts, have invented certain new and useful Improvements in Reciprocating Mechanisms for Spooling-Machines, of which the following is a specification.

My invention relates to a reciprocating mechanism for spooling apparatus, and is designed more especially for the spooling apparatus used in connection with my machine for coating electric conductors, which is the subject of an application for Letters Patent Serial No. 259,577, filed May 9, 1905.

Respecting its broad features, the invention is capable of more extended application, as for example, it may be used with advantage in certain classes of machine tools or other devices, wherein simultaneous rectilinear reciprocating and rotary motions of a single member is desired.

The object of the invention is to provide a simple and compact reversing mechanism for rectilinearly movable rotating elements, whereby continuous rotary motion may be translated into reciprocating motion.

In carrying my invention into practice, two rotatable elements are employed, one of which is adapted to rotate at speeds alternately higher and lower than the speed of the other element, which is relatively constant. By means of a suitable power-transmitting connection, such for example as a nut on the differential speed element and a screw on the constant speed element, or vice versa, the former element is caused to impart a reciprocating rectilinear motion to the second or constant speed rotating element. The elements may be driven separately at the desired speeds, but I have devised a special form of change-speed device by which one element is capable of driving the other, and the constant speed of one is converted into differential speed of the other, or conversely. This change-speed device comprises separate driving connections between the rotatable elements which have different velocity ratios, and they are so actuated, one with respect to the other, as to be thrown alternately into and out of operation, by means of a suitable automatically-actuated mechanical or electro-magnetic arrangement, which also forms part of this invention. According to the preferred embodiment, the rotatable elements are each provided with one of a pair of similar gears, and between the gears are separate driving connections. These connections comprise two sets of pinions, the pinions of one set being similar as regards their number of teeth and are permanently in mesh with the gear on the driving element, while the pinions of the other set are dissimilar and are adapted to be moved periodically into and out of mesh with the gear on the other element for driving the same. The pinions of one set are connected with the pinions of the other set by pivotally-mounted rotatable shafts, of which there are two. The pinions on the free ends of the shafts, which are adapted to be moved alternately into and out of operation, I shall designate for convenience of description the "movable pinions", and the other pinions, the "fixed pinions", as the latter are constantly in mesh with the driving gear.

By suitably proportioning the number of teeth on the pinions of one set with respect to the number of teeth on the other, any desired character of rectilinear reciprocating motion may be obtained. As for example, in my spooling apparatus, I may employ gears on the two rotatable elements which are each provided with one hundred teeth, and in connection therewith use fixed pinions having twenty teeth each and movable pinions having together an equal number of teeth, one greater and one less than twenty, as nineteen and twenty-one, respectively, or eighteen and twenty-two, etc. With this arrangement one revolution of the gear on the driving element will rotate the fixed pinions and their respective shafts each five times, which means that the movable pinions will also rotate five times. Assuming the pinion carrying twenty-one teeth to be in mesh with the gear on the driven element; the pinion will rotate the gear through one revolution plus an angle equal to the pitch-arc of five of its teeth, since the pinion has twenty-one teeth; whereas when the pinion having nineteen teeth is thrown into mesh with the driven gear it in turn will rotate the gear through one revolution less an angle equal to the pitch-arc of five teeth, for the reason that it carries only nineteen teeth. In other words, with the gears and pinions specified, the velocity ratios are such that the driven rotatable element is caused to rotate one-twentieth of a revolution faster than the driving rotatable element when the first of the movable pinions is operating, and one-twentieth of a revolution slower when the second pinion is operating. Hence, as these operations occur successively, the nut carried by the driven element will rotate alternately at higher and lower velocity than the screw on the driving element, and thereby produce relative rectilinear reciprocating motion at regular periods. Obviously, any desired speed of reciprocation may be obtained by selecting the proper velocity ratios between the gears and pinions; or this may be accomplished by varying the pitch of the nut and screw connection between the elements.

In some classes of service it may be desirable to have the velocity at which the reciprocating element moves in one direction different from that at which it moves in the opposite direction, as for example, in the operation of some machine tools, wherein the working stroke may have a definite speed and the return stroke a much more rapid speed, so as to economize time between the working strokes. In order to meet such condition, the number of teeth on the movable pinions must be disproportionately higher and lower than the number on the fixed pinions. That is to say, with movable pinions having, for instance, twenty-two and nineteen teeth, respectively, (assuming each gear to have a hundred teeth as before) the driven element will be rotated alternately at speeds one-tenth of a revolution higher and one-twentieth lower than the speed of the driving element, and consequently, through the medium of the nut and screw transmission, the reciprocation will be at different velocity in opposite directions.

From the foregoing, it will be noted that when one movable pinion has a certain number of teeth more than the number of teeth of the fixed pinions, and the other movable pinion has a different number less, the rate of the reciprocation in opposite directions will be different. To state the matter in a different way, let $n$ represent the number of teeth on each of the fixed or similar pinions, then when one movable pinion has $n$ plus $x$ teeth, and the other $n$ minus $y$ teeth, and $x$ and $y$ are different quantities, the velocity ratios of the pinions relatively to the gears will be different, and as a result the reciprocation of the rectilinearly movable element will be more rapid in one direction than in the opposite direction. And when the numbers of teeth bear the relation of $n$ plus $x$ and $n$ minus $y$, and $x$ equals $y$, the rate of reciprocation will be the same in each direction. While I have described the fixed pinions as similar, and the movable pinions as dissimilar, the converse of this arrangement is to be considered a certain equivalent, or both may be dissimilar.

Another feature of the invention pertains to the means for actuating the change-speed device, whereby the movable pinions are automatically and successively changed with regular periodicity. These successive operations of simultaneously throwing one pinion into and the other out of engagement with the driven gear must occur instantaneously, so that no idle time element intervenes between the period when one pinion is moved out of operation, and the other moved into operation; and thereby prevent lost-motion at the change of strokes of the reciprocating element. The prevention of this lost-motion is an important feature in spooling machines, for otherwise the thread or wire in the spooling operation would be caused to overlap or form superposed layers at the ends of the spool. It is desirable then to change the directions of motion of the spool-carrying or reciprocating element instantaneously. To accomplish this object, the pinious must be thrown into and out of operation quickly, as by a sudden impulse. This impulse is derived from a suitable spring-actuated throwing-mechanism which, during each stroke of the reciprocating element, is subjected to tension, and is adapted to act alternately in reverse directions for throwing the movable pinions into and out of mesh with their gear. In order to operate the pinion throwing mechanism at the proper instant, the actuating spring is released by a trigger arrangement. This latter may be automatically actuated by the movement of the reciprocating element or the spool carriage moving therewith, either through mechanical means or electromagnetic means. By regulating the time when said release comes into play, the length of the strokes of the resiprocating element may be varied to suit any given condition of operation.

For a better understanding of the construction and operation of the apparatus, reference is made to the following description, taken with the accompanying drawings, which illustrate one embodiment of the invention, and the novel features thereof will be pointed out with particularity in the appended claims.

Figure 18:
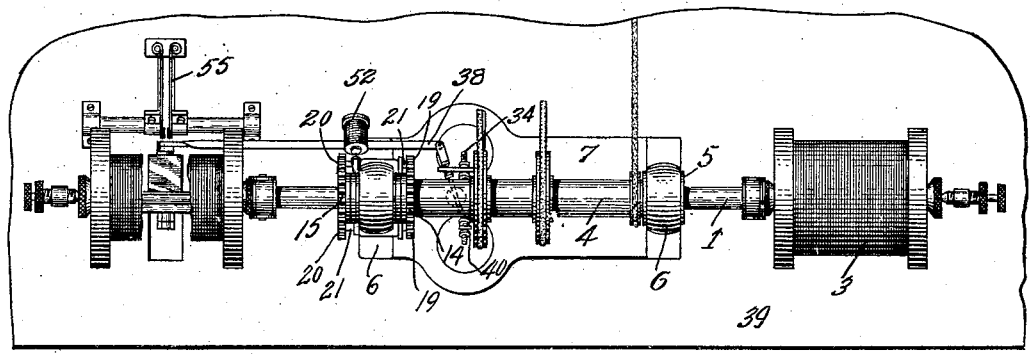
Figure 19:
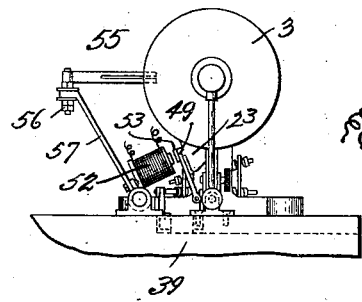
Figure 20:
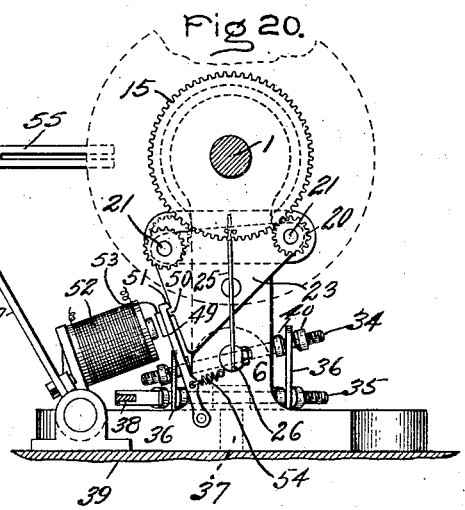

In the accompanying drawing, Figure 1 is a side elevation of my improved reciprocating or reversing mechanism shown applied to a spooling apparatus; Fig. 2 is a plan view thereof with a portion broken away; Fig. 3 is a vertical longitudinal section of the mechanism; Figs. 4 to 7 inclusive are enlarged transverse sections taken respectively, on lines 4—4, 5—5, 6—6 and 7—7, in Fig. 1 looking in the direction indicated by the arrows; Fig. 8 is a fragmentary view of the pinion-throwing mechanism of the change-speed device; Fig. 9 is a side view of the same; Figs. 10 to 14 inclusive illustrate stages in the cycle of operation of the trigger or releasing means for the pinion-throwing mechanism; Fig. 15 is a side elevation of a modified construction of the actuating means for the trigger; Fig. 16 is a sectional view taken on line 16—16 of Fig. 15; Figs. 17 and 18 are respectively, a side elevation with parts in section and a plan of a modification having an electromagnetically-controlled tripping device; and Fig. 19 is an end elevation of the modification illustrated in Figs. 17 and 18; and Fig. 20 is an enlarged view similar to Fig. 19 but with the spool removed.

Referring to the drawings, 1 represents the main shaft of the spooling apparatus, which is adapted to have two simultaneous movements; to reciprocate the spool carriages 2 that are connected thereto, and rotate the spools 3 mounted in the carriages. This shaft, which constitutes the driving element of the apparatus, may be mounted to rotate in any suitable manner. I prefer, however, to arrange it axially within a hollow shaft 4 with which it rotates, and in which it is capable of moving longitudinally. The hollow shaft is secured against endwise movement, and is mounted to rotate in bushings 5 at its ends which are arranged in the pedestals 6 of the frame 7.

The main shaft 1 is of greater length than the hollow shaft 4, and extends at each end beyond the ends of the latter shaft. Bearing sleeves 8 and 9' for the main shaft are provided at the ends of the hollow shaft and the sleeve at the right end is provided with a spline or feather 9, Fig. 3, which engages in a longitudinal slot or way 10 of the shaft 1. By this arrangement the shafts may rotate together and one is free to reciprocate. One function of the hollow shaft is to serve as a support for the driving pulleys 11 which are adapted to impart rotation to the main shaft. It may be dispensed with, the main shaft being splined directly to the pulley, which latter, of course, would be secured against lateral movement in any suitable manner. Any means will answer the purpose that is capable of imparting rotary motion to the main shaft, and at the same time permit of the latter to reciprocate. When the two shafts are used as described, they constitute together what I shall term for convenience of description the "driving element" of the apparatus.

In order to reciprocate the main shaft a second rotating element 12, Fig. 3, is employed, which preferably, although not necessarily, derives its power from the driving element or main shaft. This element which I shall term the "driven element", is adapted to rotate alternately at different speeds, which with respect to the constant speed of the driving element, is of a higher velocity during one period and of a lower velocity during the succeeding period. This differential speed of the driven element is made use of for reciprocating the main shaft through the medium of nut and screw power-transmitting connection. As shown in Fig. 3, the shaft 1 is provided with a screw-thread 1ᵃ at the central portion with which engages a nut 13 on the differential speed or driven element.

To rotate the driven element and the nut, I provide a special form of change-speed device. This comprises a gear 14 secured to the hollow shaft 4 of the driving element, a similar gear 15 connected with the nut 13, and separate driving connections between them. The change-speed device is arranged on the left pedestal of the supporting frame. The gear 14 is disposed at the right side of the pedestal, and the other gear 15 at the left, and the driving connections between the gears are disposed at the front and back of the pedestal respectively. The gear 15 and the nut 13 are connected by a tubular or other support 16, Fig. 3, which is arranged between the main shaft and the tubular shaft. More particularly, the support and gear are connected rigidly by the intermediate bearing sleeve 9' at the left end of the hollow shaft, Figs. 1, 2 and 3. This connecting sleeve is formed with an annular flange 17 which is circumferentially grooved to receive the depending end or tip of a retaining finger 18 secured to the adjacent pedestal, Fig. 3, so as to prevent lateral displacement of the gear 15, the nut 13, the sleeve 16 and the connecting sleeve, which all go to make up the driven or differential speed element 12.

The connections between the gears must have different velocity ratios in order to impart a differential speed to the driven element from the constant speed-driving element. The connections comprise a set of similar pinions 19 permanently in mesh with the driving gear 14, and a set of two dissimilar pinions 20, which latter are each adapted to be thrown alternately into and out of mesh with the driven gear 15. These two sets of pinions I have designated for convenience of description "fixed pinions", and "movable pinions", respectively. The pinions of each set are keyed at corresponding ends of two pivotally-mounted arbors 21. At the ends adjacent the fixed pinions the arbors are journaled to have a certain amount of play in a transverse plate 22 secured to the pedestal, Figs. 1 and 6. At their opposite ends they are mounted in an oscillatory carrier or support 23, which oscillates periodically, and thereby alternately moves the dissimilar pinions 20 into and out of mesh with the driven gear 15. The support 23 pivots on the end of a bolt 24, Figs. 3 and 5, at the left side of the pedestal, through which latter the bolt extends.

The movable pinions of the change-speed device are dissimilar for the purpose of imparting a differential rotative speed to the driven element, whereby the nut 13 of said element, by its successive low and high speeds, causes the rotating screw of the driving element to move longitudinally back and forth. The pitch of the thread of the nut and the screw may be of any dimension, according to the lineal speed desired for this reciprocating movement of the screw and the main shaft. In the present case, the ratios of the gears and pinions may be assumed to be 5 to 1, and the number of teeth on each gear one hundred; on the fixed pinions twenty each, and on the movable pinions nineteen and twenty-one respectively. As shown in Fig. 6, the fixed pinions 19 are permanently in mesh with the driving gear 14, while only one of the movable pinions 20 at a time is in mesh with the driven gear 15, Fig. 5. When the pinion with nineteen teeth is driving the gear 15, the driven element will rotate less rapidly than the driving element, so that the nut and screw will rotate at relatively different speeds and cause thereby the screw and main shaft 1 to travel laterally in one direction with respect to the nut. When the pinion having twenty-one teeth is in mesh with the driven gear, the nut is rotated more rapidly than the screw, and the main shaft travels in the opposite direction. These strokes are designed to occur in regular succession, and for this purpose an automatic means for throwing the pinions into and out of operation is employed. To enable this operation to take place smoothly, and without any appreciable lost-motion between the pinions and gear during engagement and disengagement and a resulting idle period at the reversal of strokes of the reciprocating member, the pinion-throwing mechanism includes an actuating device which causes the movable pinions to respectively engage and disengage with the gear instantaneously.

The actuating device is so arranged as to be capable of acting alternately in opposite directions for oscillating the support or carrier 23 to move the pinions into and out of operation. The specific means employed for this purpose comprises a leaf-spring 25 secured in a rock-shaft 26 at one end, and attached to the oscillating support at its opposite end. Coöperating with the spring is a detent or trigger arrangement 27. This latter is adapted to hold the support or carrier at rest while either pinion is in mesh with the gear, as shown in Fig. 5, and to release the support when the spring is flexed and ready to act. The detent or trigger and spring may be actuated separately by suitable automatic means which operate synchronously, but I prefer to actuate them together by the rock-shaft 26 which controls the spring. This shaft is mounted in the lower portion of the left pedestal, Figs. 1 and 3, and projects at its ends beyond the opposite sides thereof. On one end it carries the spring 25, and at the other it is connected with stop-actuating mechanism which is operated by the movement of the left spool carriage 2, as will be explained hereinafter. The rock-shaft lies below the bolt or pivot 24 of the oscillating support, and the spring connects with the latter at a point above and in a right line connecting centers of the pivot and the rock-shaft. By this arrangement the spring can be bowed or flexed on either side of the center line by the movement of the rock-shaft. To permit the spring to flex, it is necessary to provide a slight play between it and the oscillating support. The oscillating support is arranged between the pedestal and the spring, and from the side adjacent to the spring project two parallel fingers or pins 28, Fig. 5, between which the free end of the spring loosely engages.

The movement of the rock-shaft is adapted to occur periodically. That is to say, during the time either pinion 20 is in engagement with the driven gear 15, or in the position shown in Fig. 5, the rock-shaft is at rest, and slightly previous to the end of each stroke of the reciprocating main shaft 1, the shaft 26 is rocked by the stop or other actuating mechanism. The effect of this movement is best illustrated by Fig. 8. While the shaft is idle, the spring occupies a normal or central position, as indicated by the dotted lines $a$. As the shaft is rocked toward the right or clockwise, the spring is flexed and assumes a final position indicated at $b$. Simultaneously with the spring reaching this fully flexed or energized position, the trigger or detent is released by the movement of the rock-shaft, and due to the tension of the spring, the oscillating support is thrown into the position shown from the position indicated by the dotted lines $c$, and thereby reversing the position of the pinions. Immediately following the throw of the support to its new position, the detent becomes automatically locked by the first of the retrograde movement of the stop and holds the support stationary, and in the meantime the spring returns to its normal position $a$. The operation of flexing the spring in the opposite direction, to the position indicated by dotted line $d$, and the subsequent release of the trigger, is repeated when the shaft is rocked in the reverse direction. This causes the support and the pinions to be again reversed. This cycle of movement is successively repeated by the periodic rocking of the shaft.

In Figs. 8 to 13, the construction of the detent and its operation is graphically illustrated. It comprises an arm 29 carried by the rock-shaft 26, which extends to one side thereof and overlaps a portion of the support 23. The adjacent surfaces of the support and arm are provided with projections or cams 30 and 31, respectively, which are adapted to interlock so as to hold the support in fixed position while either pinion is in mesh with the gear 15. The projections are each provided with two opposite parallel surfaces 32 and 33, that are substantially tangential to the arc movement of the arm 29. The surfaces 32 are adapted to engage when the support 23 is in one position, while the surfaces 33 engage when the support is in the other position, as shown, respectively, in Figs. 10 and 13. These surfaces have a wiping contact with each other and for this reason should be carefully finished and of good wearing metal. During the movement of the arm shaft 26 to flex the spring the arm moves at the same time and causes the projection 31 to move with respect to the other on the support. The projections should be so proportioned that they will retain their engagement during the entire act of flexion of the spring, and release when the spring is fully set, by the one passing off the other. In order to facilitate their releasing, the ends of the projections are beveled, forming thereby substantially diamond-shaped cross-sections. Fig. 8 shows the projection 31 on the arm just in the initial stage of engaging after the support has been actuated and the spring and arm are returning to the position indicated in Figs. 5 and 10. This latter movement takes place principally by the action of the spring. When the shaft 26 is rocked to the left, or anti-clockwise, the spring moves to the position $d$, Fig. 8, and the projection 31 to the position shown in Fig. 11, representing that part of the stage when the surfaces 32 are about to disengage. As soon as they are released by the further movement of the rock-shaft, the projection 30 snaps over the projection 31 in virtue of the movement of the support under the action of the spring, and it takes up the initial position shown in Fig. 12, and as soon as the return travel has begun and the adjustable abutment 41 and finger 42 have ceased to engage, it takes up the final position shown in Fig. 13. When again the shaft 26 rocks to the right, the projections move successively from the releasing position to the engaging position shown in Figs. 14 and 8, respectively, and finally to the engaged position shown in Fig. 10. This cycle of operation is repeated with each complete movement of the rock-shaft. It will be observed that the projection on the arm passes completely around the other projection in the successive steps in the cycle of motion.

The actuating mechanism for the rock-shaft is located at the end thereof opposite to the end carrying the spring 25. Such mechanism comprises a pair of cross-beams 34 and 35 which are connected at adjacent ends by links 36, and are mounted respectively on the end of the rock-shaft and the base-plate of the apparatus, Figs. 1 to 6. The latter beam is pivotally mounted on the base-plate by a stud 37, Figs. 3 and 6, and receives an oscillating motion from a reciprocating actuator or rod 38, that extends horizontally along the top of the stand 39 of the apparatus and parallel to and at the rear of the left spool carriage, so as to receive its motion from the carriage at certain points in each stroke thereof. The cross-beams oscillate in planes at right angles to each other, the beams 34 oscillating on the horizontal rock-shaft in a vertical plane, and the other beam in a horizontal plane on the vertical stud 37. The stud is preferably arranged at one side of the plane in which the beam 34 moves, as shown in Fig. 2, and consequently the connecting links 36 are in all positions inclined more or less to one side of the vertical plane. The ends of the links engage between shoulders 40 on the cross-beams, and are slotted to afford freedom of movement. The links are of such length that when one is almost in a vertical position the other is almost in a horizontal position, Figs. 1 and 2. The oscillating movement of the beam 35 causes the lower ends of the links to move simultaneously one toward and the other away from the plane in which the other beam oscillates. This movement raises the upper end of one link, while lowering the corresponding end of the second link, and thereby alternately pushing up the opposite ends of the beam 34 and rocking the shaft 26. Thus, as the actuator 38 reciprocates, the beam 35 swings back and forth, and communicates its motion to the other beam through the medium of the links, which act alternately to the end that they successively urge their respective ends of the beam upwardly, causing it to oscillate and rock the shaft.

The actuator 38 is operated by a stop device comprising adjustable abutments 41 depending from the lower portion of the left spool carriage, and a finger 42, Figs. 1 and 4. The finger is connected with the actuator and is arranged to project between the abutments, so as to be acted upon by each alternately as the carriage approaches the ends of its strokes, and thereby imparts motion to the actuator. The finger is carried at the upper end of a crank arm 43 that is secured to a transverse rock-shaft 43$^a$ arranged below the carriage and mounted in a fixed bearing 44 on the stand-top 39. A similar crank-arm 45 connects the actuator with this shaft and communicates the motion which the latter receives from the finger to the actuator.

The finger normally occupies a central position so as to be in the path of the approaching abutments on the moving carriage, and is yieldingly held in such position so that it will automatically return after each actuation.

For this purpose the spring 25 is usually sufficient, but for greater certainty a spring 46, Fig. 2, is usually employed. This is a flat spring fixed at one end to the stand-top 39, and at its other or free end is connected to the actuator. In its unflexed position the spring holds the finger in a central operative position and permits the latter to be depressed to one side or the other by the abutments. When the finger is depressed, the spring is placed under tension by the movement of the actuator, which tension reacts to return the finger as the abutment moves away out of engagement with it. Also the spring coöperates to a certain extent with the spring 25 of the pinion-throwing mechanism to maintain the several intervening parts between the detent or trigger 27 and the finger 42 in their central or normal positions, during the intervals between the strokes of the main shaft and the spool-carriages.

Taking up in a general way the operation of the apparatus as a whole, let it be assumed that the main shaft and spool carriages are moving to the left, as indicated by the arrow, Fig. 1, and are in the initial stage of this movement. As the shaft nears the limit of its movement, the abutment at the right end of the left spool carriage is moved against the finger of the actuating device for the pinion - throwing mechanism and depresses it. This imparts motion to the actuator, which in turn, rocks the rock-shaft and calls into play the pinion - throwing mechanism. The pinions of the change-speed device thereby cause the nut of the driven element to be rotated at a speed greater or less than that of the screw of the driving element thereby causing the latter to move longitudinally in one direction or the other. At the initial part of this reverse stroke the right-hand abutment moves away from the finger, and the latter returns to its central position under the action of its spring. Near the final part of the reverse movement the left abutment actuates the finger and causes, through the intermediate devices, the reversing of the pinions of the change-speed device, whereby the main shaft and carriages are moved again to the left, thus completing the cycle of movement of the apparatus.

A modification relating to a portion of the actuating mechanism for rocking the rock-shaft is shown in Figs. 15 and 16. In this arrangement a miter gear is provided, comprising a bevel pinion 46 on the rock-shaft and a pinion 47 on the vertical pivot or shaft 48 mounted in the base-plate. The actuator 38 is connected with the latter pinion by an arm 35ª. The actuator may be reciprocated by a stop mechanism similar to that before described, and it operates to rock the pinion 47 which in turn rocks the pinion 46 and also the rock-shaft 26 of the pinion-throwing mechanism.

The modified construction embodied in Figs. 17 to 20 inclusive, pertains more particularly to an electromagnetically-actuated detent or trigger for controlling the pinion-throwing mechanism of the change-speed device. In other respects the general construction of the spooling apparatus shown is similar to that already described. Referring to Fig. 20, the detent 49 operates independently of the rock-shaft 26 that carries the spring 25. The detent is pivoted at its lower end to the base of the left pedestal, and extends upwardly along the rear edge of the oscillating support 23 for the movable pinions. The support and detent are each provided with a projection 50 and 51 respectively, which are adapted to interlock for the purpose of maintaining the support in a position of rest after each throw or oscillation thereof, and while either movable pinion is in mesh with the driven gear. When one pinion is in mesh, the projection 51 interlocks with the upper side of the projection 50 on the support, and when the pinions are about to reverse, the detent is withdrawn to permit the support to operate and throw the other pinion into operation, after which the projection 51 engages under the projection 50. To withdraw the detent so as to release the support when the pinions are to be reversed, an electromagnet 52 is employed. This is mounted on the base of the frame, and arranged with its attracting pole adjacent to the upper end of the detent at which point an armature 53 is secured. A spring 54, secured to the pedestal and the detent, tends to hold the latter in such a position that the projections 50 and 51 interlock. When the magnet is energized and attracts the armature the spring yields to permit the projections to disengage, and when the magnet is deënergized it returns the detent to cause the projections to again interlock. Connected in circuit with the electromagnet and with a suitable source of electric current (not shown) is a pair of spring-contacts 55, which are adapted to close the circuit periodically, thereby energizing the electromagnet and causing the oscillating support to be released by the movement of the detent and armature, and consequently the change-speed device to be reversed. The contacts, shown clearly in Figs. 18 and 20, are secured to the binding posts 56 mounted at the upper end of a bracket 57, and properly insulated therefrom. The free ends of the contacts are normally held apart, and project into the space between the flanges of the left spool, so that as the spool approaches the end of its stroke in either direction, it impinges upon the adjacent one of the contacts and moves it into contact with the other, closing thereby the circuit. As the spool moves away from the contacts on the return stroke, they automatically move apart, breaking the circuit and deënergizing the electromagnet. This permits the detent to return and causes the projections 50 and 51 to immediately interlock. The oscillating support of the pinion-throwing device is thus held stationary to maintain the meshing pinion in engagement with the driven gear during the stroke of the spool-carrying shaft. The finger 42 on the arm 43, Fig. 17, is disposed between two suitably spaced shoulders 43ᵇ on the spool carriage frame so that the movement of the carriage, through the intermediate mechanism, will flex the spring 25 slightly after the carriage passes the center of its stroke. It is maintained flexed until the electromagnet is energized and the detent released, whereupon the oscillating support will be positively actuated by the spring and thrown with a considerable impulse to effect proper meshing of the teeth.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In an apparatus of the character described, the combination of two rotating elements, and means operatively connected between them to rotate one of them at a speed which is alternately higher and lower than the speed of the other of said rotating elements for imparting a reciprocating motion to one of said rotating elements relative to the other.

2. In an apparatus of the character described, the combination of two rotatable elements with means which causes one element to impart a rectilinear reciprocating motion to the other at one speed in one direction and a different speed in the other direction.

3. In an apparatus of the character described, the combination of two axially alining rotatable elements with means which causes one element to impart a rectilinear reciprocating motion to the other at one speed in one direction and a different speed in the other direction.

4. In an apparatus of the character described, the combination of a driving element comprising two rotating members splined together to permit relative reciprocating movement, a driven element, and a power-transmitting means for rotating the driven element at a speed which is alternately higher and lower than that of the driving element whereby the driven element causes relative reciprocating movement of the two members.

5. In an apparatus of the character described, the combination of two rotating elements, separate coöperating devices connected respectively with the elements to rotate therewith, and an automatically-actuated means which periodically changes the speed of one element relatively to that of the other and causes said coöperating devices to produce a regularly varying rectilinear movement between the elements.

6. In an apparatus of the character described, the combination of a rotating element, a second element, means for rotating the second element in the same direction and alternately at a higher and lower speed than the first-named rotating element, and means between the elements whereby the rotation of the second element causes a regular reciprocating movement to be imparted to the first in addition to its rotary motion.

7. In an apparatus of the character described, the combination of a rotating element, means which rotates in the same direction as said element and at speeds alternately greater and less than that of the rotating element, and a nut and screw device between the element and said means whereby the element is rectilinearly reciprocated.

8. In an apparatus of the character described, the combination of two elements rotating in the same direction, a screw carried by one of the elements, a nut carried by the other element which engages the screw, and means which periodically increases and decreases the speed of the nut for causing relative reciprocating motion of the elements.

9. In an apparatus of the character described, the combination of two rotatable elements having different speeds, a device between the elements which depends for its operation upon the relative difference of speed of the elements for causing relative axial movement of the latter, driving connections between the elements, and an automatically actuated means which controls the driving connections for varying the relative speed of the elements.

10. In an apparatus of the character described, the combination of two rotatable elements having different speeds, a power-transmitting device between them which is adapted to impart a reciprocating motion to one of the elements, a gear operatively connected with the reciprocating element, a gear attached to the other element, and means between the gears which periodically changes the speed ratios between the gears for changing the strokes of the reciprocating element.

11. In an apparatus of the character described, the combination of a rotating element, a device which reciprocates the element, a gear carried by the element, a gear attached to said device, means arranged between the gears for causing the first mentioned gear to drive the other at alternately higher and lower speeds, and an automatically actuated device which controls the operative relation of said means to the gears.

12. In an apparatus of the character described, the combination of a driving element comprising two rotating members, a device which reciprocates one of said rotating members, a gear on said driving element, a gear on said reciprocating device, alternately operative means for connecting the gears and causing them to rotate at different speeds, and a device actuated by the reciprocated member for operating said means.

13. In an apparatus of the character described, the combination of a rotating gear, a plurality of driving means permanently engaging therewith, a single driven device adapted to be operated by said means, and a mechanism which automatically throws each of said means successively into and out of engagement with the driven device.

14. In an apparatus of the character described, the combination of a driving gear, a driven gear, two sets of intermediate pinions driving the driven gear at different velocities, and means for throwing the intermediate pinions in and out of operation alternately.

15. In an apparatus of the character described, the combination of two elements, two members continuously driven by one element, and means for operatively connecting said members alternately with the other element for driving it at a speed alternately higher and lower than that of the driving element.

16. In an apparatus of the character described, the combination of an element adapted to be driven, two continuously rotating devices capable of driving said element at different speeds, and an automatically actuated means for alternately moving said devices into engagement with the element to impart differential speed thereto.

17. In an apparatus of the character described, the combination of an element adapted to be driven, two rotating devices capable of imparting different speeds thereto, means pivotally supporting them, and means for alternately moving said devices into engagement with the element to impart differential speed thereto.

18. In an apparatus of the character described, the combination of an element adapted to be driven, two rotating devices capable of imparting different speeds thereto, a common pivotal support for them, and means for alternately moving said devices into engagement with the element to rotate it at different speeds.

19. In an apparatus of the character described, the combination of a gear rotating at constant speed, a gear adapted to rotate at a different speed, a means for driving the second gear which permanently engages the first gear and is continuously rotated thereby, and means for automatically moving said means into and out of engagement with the second gear.

20. In an apparatus of the character described, the combination of a gear rotating at a constant speed, a gear adapted to rotate at a variable speed, separate pivotally-mounted driving shafts permanently geared to the first gear, and means which is automatically actuated for gearing the shafts alternately to the second gear.

21. In an apparatus of the character described, the combination of two gears having a common axis, two shafts, similar pinions keyed to the shafts which permanently mesh with one gear, dissimilar pinions on the shafts which are adapted alternately to engage and disengage the other gear, and means for throwing the dissimilar pinions into and out of engagement with said latter gear.

22. In an apparatus of the character described, the combination of two gears arranged on a common axis, two shafts, means whereby the shafts are rotated at corresponding speeds by one of the gears, means whereby the shafts are adapted to impart alternately different speeds to the other gear, and automatically-actuated means for controlling said latter means.

23. In an apparatus of the character described, the combination of two similar gears, two dissimilar gear connections between them which have different velocity ratios, and means which automatically throws the gear connections alternately into and out of engagement with the gears at regular intervals.

24. In an apparatus of the character described, the combination of two similar gears arranged with alining axes, a plurality of pivotally-mounted shafts, similar pinions on the shafts permanently engaging with one of the gears, dissimilar pinions on the shafts, and a common means which automatically moves the dissimilar pinions into and out of engagement with the other gear in alternate order.

25. In an apparatus of the character described, the combination of two gears, separate gear connections between them, and an automatically-actuated device which alternately throws the gear connections into and out of engagement with the gears for causing variable speed between them.

26. In an apparatus of the character described, the combination of two gears, separate gear connections between them adapted to vary the relative speeds thereof, an oscillatory support or carrier for the connections which causes one connection to be simultaneously thrown into and the other out of engagement with the gears, and means for oscillating the support.

27. In an apparatus of the character described, the combination of two gears, separate gear connections between them adapted to vary their relative speed, an oscillatory support or carrier for the gear connections which permits one connection to be thrown into and out of engagement with the gears alternately with respect to the other, and an actuating device which oscillates the support.

28. In an apparatus of the character described, the combination of independently movable gears, two gear connections between them adapted to vary the relative speeds thereof, a pivotally-mounted support for the connections, and an actuating device which periodically oscillates the support for varying the connections between the gears.

29. In an apparatus of the character described, the combination of independently movable gears, gear connections between them adapted to vary the relative speeds thereof, a pivotally-mounted support common to both connections, a device adapted to actuate the support, and a mechanism for periodically actuating said device for causing the support to simultaneously throw one gear connection into engagement with the gears and the other connection out of engagement and alternately one with respect to the other.

30. In an apparatus of the character described, the combination of independently movable gears, double gear connections between them adapted to vary the relative speeds thereof, means for supporting the connections, an actuating device including a spring which is periodically placed under tension for moving said support to vary the relation of the connections to the gears, and an automatically-actuated means which reverses the direction in which said device acts for oscillating the supporting means and alternately changing the gear connections.

31. In an apparatus of the character described, the combination of independently movable gears, double gear connections between them which are adapted to operate alternately, an oscillating support for the gear connections, a device which actuates the support, means for holding the support inactive after each oscillation to maintain the connections alternately in operative relation to the gears, and means for operating the device and releasing said means.

32. In an apparatus of the character described, the combination of independently rotatable elements, differential speed connections between them which operate alternately at suitable intervals, a device which operates the connections alternately, and a periodically-actuated device which controls said device whereby the connections between the elements are alternately changed.

33. In an apparatus of the character described, the combination of a rotating element, separate driving means adapted to be alternately connected therewith, a pivotally-mounted support for said means, and a device which acts periodically in opposite directions for actuating the support to simultaneously connect one means with the element while disconnecting the other means.

34. In an apparatus of the character described, the combination of a rotating element, separate driving connections adapted to be alternately connected to the element for rotating it at different speeds, an automatically-actuated means which periodically reverses the driving connections, and means for maintaining the connections alternately in operative relation with the element during the periods between the reversals of said means.

35. In an apparatus of the character described, the combination of a rotating element, separate continuously rotating means for driving the rotating element at different speeds and which are adapted to operate alternately, and an automatically-actuated device which periodically varies the operative relation of the driving means to the element.

36. In an apparatus of the character described, the combination of a rotating element, separate rotating means which are adapted to drive the element at different speeds, and a periodically-oscillating support for said means which moves the latter alternately into engagement with the element.

37. In an apparatus of the character described, the combination of a gear, two pinions which are adapted alternately to engage with the gear for driving it at different speeds, an oscillating support for the pinions, and an automatically-actuated means for oscillating the support to effect the alternate engagement of the pinions with the gear.

38. In an apparatus of the character described, the combination of a gear, two pinions which alternately engage with the gear for driving it at different speeds, an oscillating support for the pinions, and an automatically-actuated means which periodically oscillates the support for changing the operative relation of the pinions to the gear and which maintains said operative relation during the interval between the oscillations of the support.

39. In an apparatus of the character described, the combination of a gear, two pinions which alternately engage with the gear for driving it at different speeds, an oscillating support for the pinions which moves one pinion into and out of engagement with the gear alternately with respect to the other, a spring which oscillates the support, means for holding the support in a fixed position while either pinion meshes with the gear, and a means which places the spring under tension and releases said means.

40. In combination, a gear, a pinion adapted intermittently to engage with the gear, an oscillating support for the pinion, a spring which oscillates the support, a device for holding the support in a fixed position while the pinion meshes with the gear, and means which places the spring under tension and releases said device for snapping the pinion into or out of mesh.

41. In combination, a gear, two pinions which alternately engage with the gear for driving it at different speeds, a pivoted support for the pinions, a spring which actuates the support, a rock-shaft which causes the spring to act alternately in reverse directions, and means which causes the spring to act suddenly upon the support for changing the operative relation between the pinions and gear.

42. In combination, a gear, two pinions which alternately engage with the gear for driving it at different speeds, a pivoted support which movably carries the pinions, a spring for actuating the support, a means which periodically urges the spring to act alternately in reverse directions, and means which holds the support in a definite position and releases it after the spring is flexed.

43. In combination, a gear, two pinions which alternately engage with the gear for driving it at different speeds, a pivoted support for the pinions, and an automatically-actuated trigger device or detent which periodically oscillates the support for changing the operative relation of the pinions to the gear.

44. In combination, a pivotally-mounted support or carrier, a means which acts periodically to urge the support alternately in opposite directions, a rocking arm, projections respectively on the arm and the support which engage with each other, and means for disengaging the projections for permitting said means to actuate the support.

45. In combination, a pivotally-mounted support, a spring which is adapted to oscillate the support, and an automatically-actuated means which causes the spring to oscillate the support periodically and with a sudden impulse.

46. In combination, a movable carrier, a spring which alternately acts in opposite directions upon the same, a detent which prevents the spring from acting on said carrier, and an automatically-actuated means which releases said detent to permit the spring to operate said member.

47. In combination, a spring-actuated oscillating carrier, a periodically actuated rock-shaft, an arm or detent on the rock-shaft, and engaging means between the arm or detent and carrier which hold the latter stationary between definite limits of shaft movement and release it beyond said limits.

48. In combination, an oscillating carrier, a support therefor, a spring device which oscillates the carrier, a rock-shaft mounted on the support, an arm thereon, engaging projections between the arm and carrier which engage after each movement of the carrier, and an automatically-actuated mechanism which operates the rock-shaft for placing the spring device under tension and disengaging the projections whereby the carrier is caused to oscillate by virtue of the spring.

49. In combination, an oscillating carrier, a spring adapted to oscillate the same, a rock-shaft which causes the spring to act alternately in opposite directions, an arm on the rock-shaft, and engaging projections between the carrier and the arm which are disengaged by the movement of the rock-shaft after the spring is flexed.

50. In combination, a pivotally-mounted carrier, a flat spring, a connection between the free end of the spring and the carrier, and a means which flexes the spring and then releases it to cause the free end thereof to move the carrier.

51. In combination, a pivotally-mounted carrier, a spring, a connection between the free end of the spring and the carrier, means for flexing the spring alternately in opposite directions, and an automatically-actuated means which holds the carrier fixed while the spring is flexing and releases it after flexion for causing the spring to oscillate the said carrier.

52. In combination, a pivotally-mounted carrier, a spring, a connection between the free end of the spring and the carrier, a rock-shaft to which the opposite end of the spring is secured, and a means attached to the shaft which holds the carrier in fixed position while the rock-shaft flexes the spring and releases the carrier after flexion for causing the spring to oscillate it.

53. In combination, a pivotally-mounted carrier, a spring, a rock-shaft to which the spring is fixed, a connection between the spring and the carrier, means which automatically rocks the shaft for placing the spring under flexion, and means which automatically releases the spring after flexion for causing it to actuate the said carrier.

54. In combination, a pivotally-mounted carrier, a flat spring, a rock-shaft which flexes the spring alternately in opposite directions, a connection between the spring and the carrier, and a means attached to the rock-shaft which holds the carrier in a fixed position while the rock-shaft flexes the spring and is released at the end of each movement of the rock-shaft for permitting the spring to actuate the said carrier.

55. In combination, a pivotally-mounted support or carrier, a rock shaft, a spring attached to the rock-shaft which is flexible alternately in opposite directions thereby for oscillating the carrier, an arm on the rock-shaft, and cams or projections on the arm and the carrier which alternately engage and disengage by the movement of the arm for holding the carrier in fixed position during flexion of the spring and for releasing it after flexion thereof.

56. In combination, a pivotally-mounted carrier, a spring for oscillating the same, a rock-shaft carrying the spring, an arm on the rock-shaft, and projections on the arm and the carrier adapted to interlock while the spring is flexing and to release after the spring is flexed whereby the latter is free to act, said projections having sets of surfaces which alternately engage each other.

57. In combination, a support or frame, a tubular shaft rotatably mounted thereon, a shaft rotating with the tubular shaft but slidable therein, a screw thereon, a nut engaging the screw, a gear carried by the tubular shaft, a gear connected with the nut, variable speed connections between the gears which are mounted on the support, and an automatically and periodically actuated mechanism which alternately changes the operative relation of the connections to the gears whereby the nut is alternately rotated at a higher and lower speed than the screw-shaft and causes the latter to reciprocate.

58. In combination, a rotating shaft having a screw thereon, a support therefor, means for driving the shaft, a gear movable relatively to the shaft, a rotating nut engaging the screw, a second gear, a connection between the nut and the second gear forming therewith a rigidly connected structure, and a variable speed gear mechanism between the gears which rotates the nut alternately faster and slower than the screw and causes thereby the shaft to reciprocate.

In witness whereof, I have hereunto set my hand this fourth day of May, 1905.

JOHN G. CALLAN.

Witnesses:
JOHN A. McMANUS, Jr.,
HENRY O. WESTENDARP.